United States Patent

Von Recklinghausen

[15] 3,668,545

[45] June 6, 1972

[54] APPARATUS FOR AMPLIFIER PROTECTION

[72] Inventor: Daniel R. Von Recklinghausen, Arlington, Mass.

[73] Assignee: H. H. Scott, Inc., Maynard, Mass.

[22] Filed: Nov. 3, 1969

[21] Appl. No.: 871,603

Related U.S. Application Data

[63] Continuation of Ser. No. 649,661, June 28, 1967, abandoned.

[52] U.S. Cl. ..... 330/207 P, 330/24, 317/16

[51] Int. Cl. ..... H03f 21/00

[58] Field of Search ..... 330/13, 85, 11 P; 307/202; 324/110; 317/16

[56] References Cited

UNITED STATES PATENTS

| | | | |
|---|---|---|---|
| 2,832,900 | 4/1958 | Ford | 307/202 X |
| 3,079,543 | 2/1963 | Decker | 307/202 X |
| 3,089,098 | 5/1963 | Noe | 330/19 |
| 3,160,767 | 12/1964 | Tindall | 307/202 |
| 3,408,589 | 10/1968 | Nishioka | 330/51 |
| 3,449,598 | 6/1969 | Wright | 307/202 |
| 2,988,684 | 6/1961 | Rijckaert | 317/16 X |
| 3,300,659 | 1/1967 | Walters | 307/94 |

*Primary Examiner*—Nathan Kaufman
*Attorney*—Rines and Rines

[57] ABSTRACT

Protection for amplifiers and the like is provided by proportionally combining a measure of the voltage across the output terminals with a measure of the output current and actuating switching means across the input terminals when a proportional combination exceeds a predetermined value. Transistors may be employed as the amplifier and switching means, and push-pull amplifiers may be so protected. In one embodiment a current-responsive protection device protects both transistors of a push-pull circuit. Multiple proportioning ranges may be provided in a non-linear protection arrangement, and the protection device may be rendered insensitive to short duration overloads. Reverse current protection may also be provided by the addition of one or more diodes.

17 Claims, 15 Drawing Figures

INVENTOR
DANIEL R. VonRECKLINGHAUSEN

BY Rines and Rines
ATTORNEYS

INVENTOR
DANIEL R. VonRECKLINGHAUSEN

BY Rines and Rines

ATTORNEYS

INVENTOR
DANIEL R. von RECKLINGHAUSEN

Rines and Rines

ATTORNEYS

INVENTOR
DANIEL R. VONRECKLINGHAUSEN

Rines and Rines

ATTORNEYS

INVENTOR
DANIEL R. vonRECKLINGHAUSEN

Rines and Rines

ATTORNEYS

APPARATUS FOR AMPLIFIER PROTECTION

This application is a continuation of Ser. No. 649,661, filed June 28, 1967, now abandoned.

The present invention relates to apparatus for protecting the output stage or stages of an amplifier, and, more particularly, to improved circuits for automatically protecting output devices such as tubes or transistors from experiencing excessive dissipation, excessive voltages, and excessive currents in the presence of signals while connected to a load which may be of any resistive or reactive value including even the extremes of open and short circuits.

Previous protective circuits have been subject to a multitude of disadvantages. Such circuits have generally relied upon measuring the direct input current to the amplifier stages or the direct or alternating output current of these amplifiers, which are related to each other. The direct instantaneous input current to a Class B series-connected push-pull amplifier, for example, is equal to the instantaneous output current; and the average direct input current in the case of a sinusoidal output signal is equal to 0.448 times the rms output current. In the case of a resistive load, average dissipation and instantaneous dissipation are related only to the value of the total load resistance in the circuit and the total supply voltage presented to the amplifier as explained, for example, in my article "Class B Amplifier Dissipation, Instantaneous and Steady State," appearing in the IEEE Transactions on Audio, Volume AU–13 No. 4, July/August, 1965. In this case, the maximum average dissipation of an output device, such as a transistor, is equal to 20.3 percent of the maximum sine wave power that the amplifier is capable of delivering into that load; and the maximum instantaneous dissipation per transistor is equal to 50 percent of the maximum sine wave power that this amplifier is capable of delivering into that resistive load. The latter amount of instantaneous dissipation is not exceeded so long as the resistive load is maintained along with the supply voltage and may be attained regardless of the wave form of the driving signal presented to the amplifier.

Among the prior-art techniques for the protection of amplifiers is a method particularly applicable to low power amplifiers and involving the application of a resistor connected in series with the output terminals so that, in the case of short-circuit conditions, a certain maximum dissipation is not exceeded. This resistor may be of a fixed value or may take the form of an incandescent light bulb or similar device that increases its resistance as current is increased. Alternatively, the same type of protection has been applied separately to the two output devices of a push-pull transistor output circuit by connecting the said resistor or incandescent light bulb or the like in series with the emitter leads of each output transistor.

As can be appreciated, this method of protection is wasteful because a large amount of useful power is dissipated in these resistors instead of being supplied to an external load to perform a useful function. The output devices, moreover, have to be sufficiently large and rugged so as to be able to withstand the amount of temperature rise generated by internal dissipation under adverse circumstances. Amplifiers of larger power ratings have been more difficult to protect; the above-mentioned resistor protection serving only for partial protection and additional protection being provided by such elements as fuses connected in series with the output terminals or supply terminals, or both. Additional protection is also provided by measuring the instantaneous output or supply current and activating a protective circuit when this current is exceeded. Such techniques, however, produce large voltage transients in disconnection and connection or require manual resetting which, of course, causes an interruption in operation, though perhaps less inconvenient than the time required to replace a blown fuse.

Alternate approaches have involved the use of voltage regulator diodes or series-connected semiconductor diodes which limit the maximum amount of current which the output device (such as a transistor) can conduct by essentially measuring the voltage drop across an emitter resistor of the output stage, and then, by conduction, limiting the maximum driving voltage available to the series-connection of the emitter resistor and the emitter base junction of the output device.

The common failing of all of these prior circuits, however, resides in the fact that only a measure of the average or instantaneous current through the output device is used to activate the protective mechanism. Since the amount of instantaneous dissipation of an output device is proportional to the product of instantaneous current through the device and instantaneous voltage across the device, an inadequate or insufficient parameter has thus been universally used for protection, because, in essence, the power supply rather than the output devices themselves has been protected, although it has been recognized that the output devices themselves may be the weakest link in the chain. The following example, also described in my aforementioned article, may perhaps bring this to light.

By the laws of conservation of energy, the amount of dissipation in an amplifier is equal to the difference between the amount of power delivered by the supply minus the amount of power delivered to the load. If the load should be resistive, it is obvious that this load can dissipate power. If the load is reactive, such as an inductance, a capacitor, or any resonant circuit such as a loudspeaker, the reactance cannot dissipate any power, although both voltage and current are developed across them, and since the power supply does deliver a voltage and a current to the output circuit, all this direct-current input power must be dissipated in the output devices. With a sinusoidal output signal delivered to a reactive load, for example, the average dissipation per device may reach 63.7 percent of the maximum average output volt-amperes; and because of energy storage in the reactance, the maximum instantaneous dissipation per output device may reach 259.8 percent of the average output volt-amperes. It can therefore be seen that a protective circuit as used by the prior art will result in either insufficient protection of the output devices or in the use of more rugged and consequently costlier output devices than required.

An object of the present invention, accordingly, is to provide a new and improved apparatus for protecting such output devices, taking into account both the current through the device and the voltage across the device by proportioning a measure of the current through the device and a measure of the voltage across the device such that the protective circuit will be activated instantaneously upon exceeding a total of the predetermined proportion and thus a predetermined amount of power dissipation in the output device.

A further object of the invention is to provide novel protection apparatus in which, in summary, the proportioning of the before-mentioned voltage and current is effected so that any continuous curve comprised of maximum instantaneous current, maximum instantaneous dissipation, and maximum instantaneous voltage will cause the protective circuit to operate when the value of the curve is exceeded.

Still a further object resides in an apparatus in which the combination of maximum instantaneous current, maximum instantaneous voltage and maximum short-time integrated power protection of output devices accommodates the larger short-duration pulse dissipation capability of output devices as compared to the smaller amount permissible under long-pulse or dc conditions.

Still an additional object of the invention is to provide a novel protector for output devices and power supplies such that a smaller amount of short-circuit current is available at the output terminals than would be produced under rated load conditions.

Another object is to provide a new and improved apparatus for circuit protection that is of more general utility, also.

Other and further objects will be explained hereinafter and will be more particularly pointed out in the appended claims.

The invention will now be described in connection with the accompanying drawings, FIG. 1 of which is a circuit diagram of a basic protection circuit constructed in preferred form in accordance with the technique underlying this invention;

FIG. 11 illustrates a further modification of the circuit of FIG. 1 adapted to accommodate higher pulse dissipation capability for pulse operation and the like;

FIG. 13 is a more complete circuit diagram of a circuit embodying the principles of the circuit of FIG. 1, but modified by features of the other figures to operate with a Class B push-pull audio amplifier or the like; and FIG. 14 illustrates a protective circuit of simplified form that, in FIG. 15, is applied to a Class B push-pull audio amplifier or the like.

Figure 1:
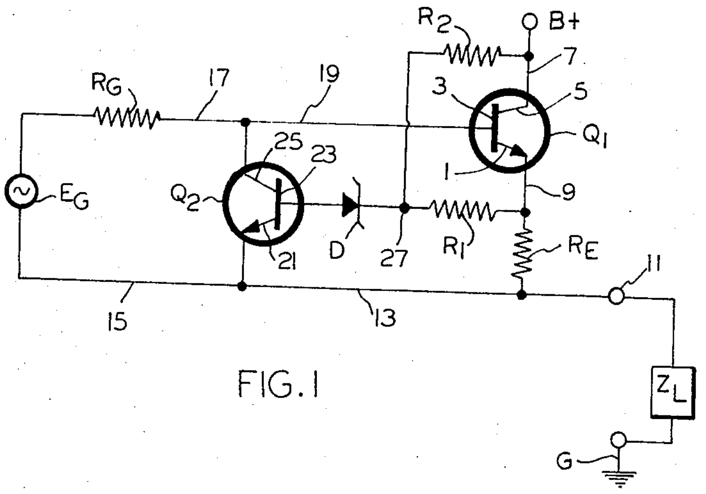

Referring to FIG. 1, a transistor amplifier stage $Q_1$ is illustrated as the device to be protected, having an emitter electrode 1, a base electrode 3, and a collector electrode 5, the latter of which is connected by way of lead 7 to a supply voltage source B+. Emitter current ($I_{E1}$) is returned to ground G by way of lead 9, current-sampling emitter load resistor $R_E$, output terminal 11 and load, schematically illustrated as impedance $Z_L$. A driving signal for transistor $Q_1$ is provided from a source or generator, generically designated at $E_G$ with its internal resistance $R_G$, by way of leads 15 and 13 on one side, and leads 17 and 19 connected to base electrode 3, on the other side. Transistor $Q_1$ thus operates effectively as a common emitter amplifier, with a small amount of negative feedback being provided by the emitter current $I_{E1}$ flowing through emitter resistor $R_E$. Alternately, voltage source $E_G$, which provides both the alternating-voltage signal and a dc biasing voltage for transistor $Q_1$, could be returned to ground G instead of being connected to lead 15, in which event transistor $Q_1$ would operate in a common collector mode, otherwise known as an emitter follower. For purposes of illustration, however, the circuit as shown in FIG. 1 will be described.

In accordance with the exemplary circuit of FIG. 1, a further transistor $Q_2$, having an emitter electrode 21, a base electrode 23, and a collector electrode 25, is employed to serve as the protection for transistor $Q_1$, being connected with the input circuit of $Q_1$. If transistor $Q_2$ should be switched to conduct, current provided by voltage source $E_G$ will flow by way of resistor $R_G$, lead 17, collector electrode 25, emitter electrode 21, and lead 15. Under normal circumstances, however, transistor $Q_2$ is not conducting, and amplifier transistor $Q_1$ operates in its normal conventional way. Transistor $Q_2$ will only conduct if the critical base-emitter voltage ($V_{BE2}$) is exceeded; namely, a value typically 0.6V for a silicon transistor. Similarly, transistor $Q_2$ will not conduct if the positive voltage at the terminal 27 (between an avalanche diode or similar device D and a resistor $R_1$ connected in series from the emitter 9 of $Q_1$ to the base 23 of $Q_2$) is less than the sum of the said voltage $V_{BE2}$ plus the voltage drop $V_Z$ of the avalanche diode D, this voltage total being measured with respect to the emitter electrode 21 of transistor $Q_2$.

When transistor $Q_1$ conducts, a positive voltage is developed on lead 9 with respect to lead 13, this voltage being equal to the emitter current of transistor $Q_1$ multiplied by the value of the emitter load resistor $R_E$. For simplicity of analysis, it may be assumed that emitter load resistor $R_E$, typically of value less than about one ohm, is substantially smaller than resistor $R_1$ and a further resistor $R_2$ connected from terminal 27 to the B+ terminal. The additional voltage drop created across resistor $R_E$ due to current flowing through resistors $R_2$ and $R_1$ may be neglected. If transistor $Q_1$ is fully saturated, or the voltage drop between emitter electrode 1 and collector electrode 5 thereof is very small, transistor $Q_2$ will conduct when the product of emitter current $I_{E1}$ (of Transistor $Q_1$), and the value of the emitter load resistor $R_E$ is equal to or larger than the sum of the emitter base voltage $V_{BE2}$ plus the voltage drop $V_Z$ of diode D. A current will consequently flow in transistor $Q_2$ which is equal to the current amplification of transistor $Q_2$ multiplied by the base current of transistor $Q_2$. If the voltage drop across resistor $R_E$ should increase further, the collector-to-emitter impedance of transistor $Q_2$ will become very low and the current provided by generator $E_G$ in lead 17 will be divided between the base current of transistor $Q_1$ flowing by way of lead 19, and the collector current of transistor $Q_2$. By this means, the voltage at the base electrode 3 of transistor $Q_1$ will be essentially stabilized with respect to output terminal 11 and will be equal to the sum of the base-emitter voltage drop $V_{BE1}$ of transistor $Q_1$ plus the emitter current $I_{E1}$ times resistor $R_E$. Any further increase in voltage $E_G$ will result primarily in an increased collector current of transistor $Q_2$ and will therefore stabilize the emitter current of transistor $Q_1$. This stabilized maximum emitter current of transistor $Q_1$ may be defined as $I_{E1\ max}$.

By a similar analysis, it may also be assumed that transistor $Q_1$ remains nonconducting (not producing any emitter current $I_{E1}$) while the value of the supply voltage B+ is increased. When the voltage at terminal 27 (in this case given by the ratio ($V_B$+) ($R_1/R_1 + R_2$) exceeds the critical value of $V_{BE2} + V_Z$, transistor $Q_2$ will again become conductively switched across the input circuit of $Q_1$. This critical voltage across transistor $Q_1$ may then be defined as $V_{CE1\ max}$.

In summary, it may be said that because of current-summing at terminal 27, the sum of a measure of the emitter current of transistor $Q_1$ and a measure of the collector-to-emitter voltage of transistor $Q_1$ is used to initiate conduction of transistor $Q_2$ when a critical predetermined total value is exceeded. It is thus a proportional combination of a first electrical response dependent upon voltage and a second electrical response dependent upon current which actuates the protective means. Clearly other relay or switching devices than transistors may also be similarly employed as later discussed.

Figure 4:
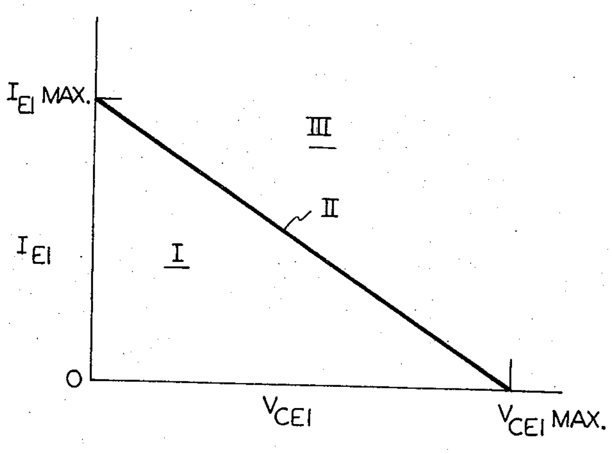
FIG. 4 is a graph illustrating the protection afforded by the apparatus of FIGS. 1–3.

Referring to the graph of FIG. 4 (plotting $I_{E1\ max}$ along the ordinate and $V_{CE1\ max}$ along the abscissa), the points $I_{E1\ max}$ and $V_{CE1}$ are shown respectively at $V_{CE1} = 0$, and $I_{E1} = 0$. Since resistors $R_E$, $R_1$ and $R_2$ are linear resistors, any intermediate value of, for example, emitter current $I_{E1}$ will require a minimum collector-to-emitter voltage $V_{CE1}$ to initiate conduction of transistor $Q_2$, and consequently a straight line between the two above-mentioned points on this diagram will show where conduction of transistor $Q_2$ is initiated. In particular, the area on the diagram labeled with $I$ is the combination of voltages and currents of transistor $Q_1$ which will not cause transistor $Q_2$ to conduct. The straight line at II shows where transistor $Q_2$ conducts. Since the maximum voltage that generator $E_G$ may produce is usually limited by its supply voltage, its internal impedance $R_G$ is also fixed. If the characteristics of transistor $Q_2$ are chosen so that the collector-to-emitter voltage drop at the maximum short-circuit current which generator $E_G$ may drive by way of its internal impedance $R_G$ is less than the base-to-emitter voltage drop $V_{BE1}$ of transistor $Q_1$, operation of transistor $Q_1$ is absolutely limited to only a very slight amount to the right of line II. Extending this analysis, transistor $Q_1$ is therefore not allowed to operate in the area III of FIG. 4, and consequently transistor $Q_1$ is protected against operation at a current larger than $I_{CE1\ max}$, a voltage higher than $V_{CE1\ max}$, and a dissipation higher than (¼) ($I_{E1\ max}$) ($V_{CE1\ max}$).

The above-described protection was analyzed for direct-current values; but if instantaneous voltages and currents are used instead of dc values, the foregoing analysis holds also for all instantaneous voltage and current components. Even momentary overloads cannot occur providing the time delay of transistor $Q_2$ is less than the rise time of voltages and currents provided by generator $E_G$.

Figure 3:
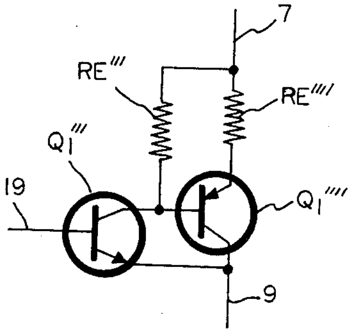
FIGS. 2 and 3 are circuit modifications of elements of the circuit of FIG. 1.
Figure 2:
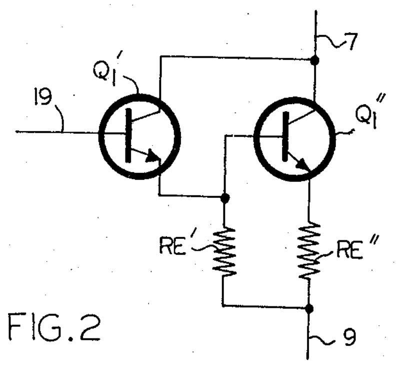

While in the embodiment of FIG. 1, transistor $Q_1$ was shown as a single transistor, it is also possible similarly to protect a plurality of transistor stages such as the pair of transistors $Q_1'$ and $Q_1''$ of FIG. 2, these transistors both being illustrated as of the NPN type. Leads 7, 9 and 19 are then provided with the same connections as in FIG. 1. Similarly, a plurality of transistors $Q_1'''$ and $Q_1''''$ of the NPN and PNP variety may be protected, as shown in FIG. 3. Leads 7, 9 and 19 are the same as in FIG. 1. Resistors $R_E'$ and $R_E'''$ in FIGS. 2 and 3, respectively, serve as means to return any leakage current of transistors $Q_1'$ and $Q_1'''$, respectively, to the effective emitter leads 9 and 7; while resistors $R_E''$ and $R_E''''$ serve as means to stabilize the operating points of transistors $Q_1''$ and $Q_1''''$, respectively. The pairs of transistors of FIGS. 2 and 3 in effect operate as a combined large-gain NPN transistor, with stages $Q_1'$ and $Q_1'''$ acting as driver transistors for $Q_1''$ and $Q_1''''$, respectively, and with the latter transistors providing most of the power handling capability.

Figure 5:
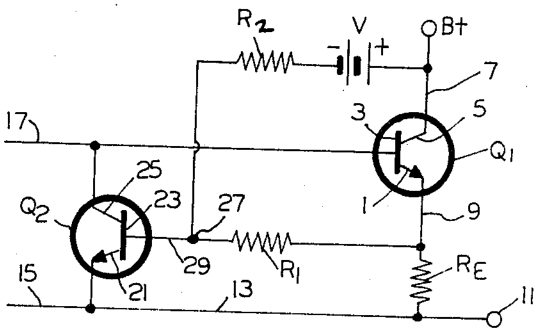
FIGS. 5 through 7 are circuit diagrams similar to FIG. 1 and illustrating modifications of the circuit thereof.

The circuit of FIG. 1 has shown the use of the sum of base-to-emitter voltage $V_{BE2}$ and avalanche diode voltage $V_Z$, determining the critical voltage for conduction of transistor $Q_2$ at connection terminal 27. Other devices than an avalanche diode D may, however, be employed. In FIG. 5, as an example, the avalanche diode D is omitted, being replaced by a lead 29 and a voltage source $V$ connected in series with resistor $R_2$. The value of voltage source $V$ to effect the above results may be determined by the following equations:

$$V = V_{CE1\ \max} - V_{BE2}\left(1+\frac{R_2}{R_1}\right); \text{ and}$$

$$V = (I_{E1\ \max} \times R_E - V_{BE2})\left(1+\frac{R_2}{R_1}\right).$$

Exactly the same line II of FIG. 4 is obtained having the same intercept points $I_{E1\ max}$ and $V_{CE1\ max}$ with the slope of the line being equal to $$\frac{V_{CE1\ \max}}{I_{E1\ \max}} = R_E\left(1+\frac{R_2}{R_1}\right).$$

Figure 6:
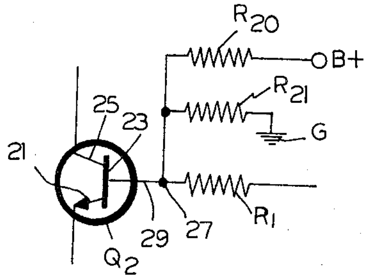

Referring to FIG. 6, the elements of FIG. 5 are further modified to eliminate even the separate voltage source V connected between resistor $R_2$ and voltage source B+. Instead, resistors $R_{20}$ and $R_{21}$ are substituted for the combination of resistor $R_2$ and voltage source $V$, resistor $R_{20}$ and $R_{21}$, in parallel, being equal in value to that of resistor $R_2$. Resistors $R_{20}$ and $R_{21}$ also form a voltage divider between supply voltage B+ and ground G, and voltage $V$ being equal, then, to B+ $(R_{21}/R_{20} + R_{21})$.

Figures 7, 8:
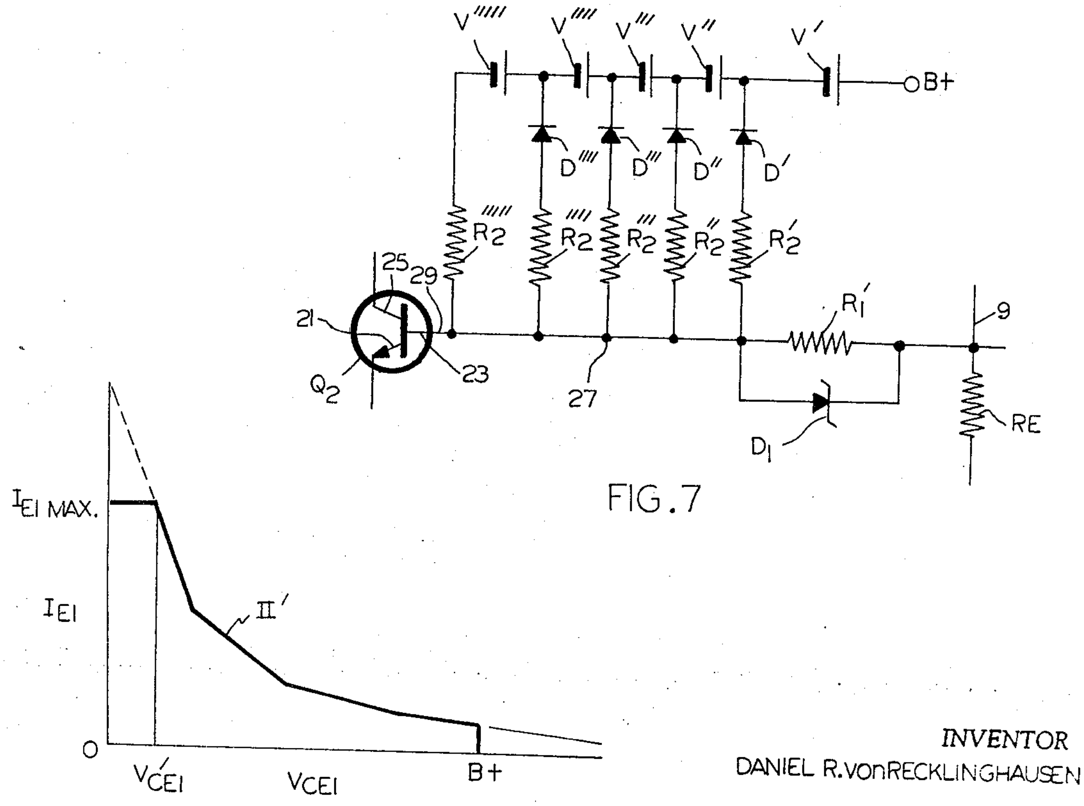
FIG. 8 is a graph illustrative of the performance of the circuit of FIG. 7.

The analysis of FIGS. 1–6 demonstrates that a straight line (as shown at II in FIG. 4) may be obtained as a critical protection line by the use of linear resistors and fixed voltages initiating the conduction of transistor $Q_2$. In FIG. 7, however, a further modification is illustrated in which resistors $R_1$ and $R_2$ are non-linear voltage-dependent resistors. If, for example, it should be desirable to have transistor $Q_1$ conduct a maximum current $I_{E1\ max}$ up to a maximum voltage $V_{CE1}'$, in such case, an avalanche diode $D_1$ may be connected to emitter lead 9 of transistor $Q_1$ and terminal 27, the breakdown voltage of this diode being chosen so that $V_{Z1} + V_{BE2} = (I_{E1\ max})\ (R_E)$. Diode $D_1$ is also bypassed with a resistor $R_1'$ which will determine the protection slope with resistor $R_2$ and voltage source $V$ at voltages $V_{CE1} > V_{CE1}'$. In this embodiment, moreover, resistor $R_2$ and voltage source $V$ of FIG. 5 are shown replaced by multiple resistors $R_2' - R_2'''''$ connected to corresponding multiple voltage sources $V' - V'''''$, each resistor except $R_2'''''$ having a uni-directional element, such respective diodes D′ – D′′′′′, connected in series. The five resistors, five voltage sources and four diodes thereby result in the protection line II′ shown in the graph of FIG. 8, consisting of five different interconnecting slopes which may be used, for example, to approximate a hyperbola or constant dissipation curve for transistor $Q_1$, or any other continuous curve which will permit safe operation of transistor $Q_1$. Just as in the circuit of FIG. 1, the maximum voltage which can exist across transistor $Q_1$ under dc operating conditions cannot exceed the voltage provided by the supply voltage source B+. The modifications of FIG. 7 provide, thus, the total protecting curve shown by the solid line II′.

As mentioned above, the protection of transistor $Q_1$, although demonstrated for direct-current conditions only, holds for all instantaneous voltages and currents across transistor $Q_1$ and operates by a limiting of driving current and driving voltage provided through lead 19 to the base electrode 3 of transistor $Q_1$. If, however, load impedance $Z_L$ is an inductance and generator $E_G$ provides rapidly varying voltages, the sudden turn-off of the emitter current $I_{E1}$ of transistor $Q_1$ can cause reverse voltages; i.e., the emitter 1 may go positive with respect to collector 5 of transistor $Q_1$ for a short period of time. If transistor $Q_1$ is properly constructed and has no internal faults, no conduction within transistor $Q_1$ will occur and transistor $Q_1$ will be essentially self-protected against reverse voltages. The circuit of FIG. 9, however, may be used in those cases where transistor $Q_1$ may be improperly constructed and, because of a misalignment of diffusion masks, an additional unintended effective diode $D_2$ may, for example, be formed between the collector lead 7 and emitter lead 9. This effective diode $D_2$ is reverse-biased during normal operation and does not affect performance of transistor $Q_1$ so long as no reverse voltages are experienced by transistor $Q_1$. When $Q_1$ experiences reverse voltages, however, diode $D_2$ formed within transistor $Q_1$ will conduct. Since dissipation capability of this diode action is substantially less than the collector electrode 5, which normally has good thermal connection to the mounting flange of transistor $Q_1$ and thence to the external heat sink, substantially all the dissipation of the inadvertently formed diode $D_2$ takes place at the emitter 1 of transistor $Q_1$. The emitter is substantially smaller in size than the collector 5 and therefore has a smaller area available for heat dissipation and an additional thermal resistance through all the transistor junctions. A silicon power transistor of the JEDEC TO–3 type, for example, may be capable of 120 watts dissipation when the case is kept at 25° C. and may withstand even higher dissipation than rated. Inherent diode $D_2$ within this transistor, however, will cause intolerably high temperatures and a failure of transistor $Q_1$ with a dissipation of less than 5 watts. It is possible, therefore, that transistor $Q_1$ may fail because sufficient energy may be stored in an inductive $Z_L$ load impedance because of the presence and inadequate power handling capability of accidental diode $D_2$. Such an inductive load impedance may be provided, for example, by a loudspeaker, with the effective resonant circuit of cone and voice coil mass and cone support stiffness being capable of storing sufficient electrical energy to cause destruction of diode $D_2$ and consequently of transistor $Q_1$.

Figure 9:
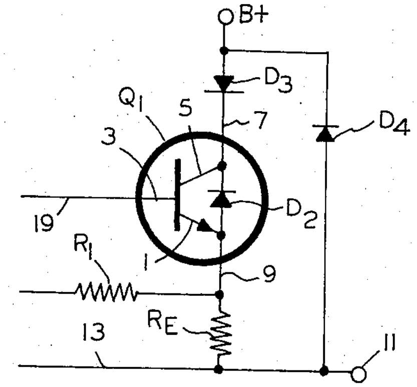
FIG. 9 is a circuit diagram of a preferred modified circuit designed particularly for the protection of a transistor against reverse voltages and currents.

To protect transistor $Q_1$ against reverse voltages and currents in such circumstances, a normally conducting further diode $D_3$ may be connected in series with collector lead 7 of transistor $Q_1$; and/or a diode $D_4$, normally nonconducting, may be connected between output terminal 11 and voltage supply B+, as illustrated in FIG. 9. Diode $D_3$ will prevent reverse conduction of transistor $Q_1$, while diode $D_4$, being in shunt with the series combination of accidental diode $D_2$ and emitter resistor $R_E$, will conduct a substantially larger current than diode $D_2$. Diode $D_2$, consequently, will not experience sufficient power to cause its destruction and the damage to transistor $Q_1$. Either diode $D_3$ or $D_4$ may thus be provided for reverse voltage and current protection of transistor $Q_1$, or both may be provided for additional protection. The use of diode $D_4$ has the advantage of limiting the maximum peak-to-peak voltage available at output terminal 11 to essentially the voltage provided by voltage source B+, because any excess energy stored in inductive load $Z_L$, which may also be resonant, is returned to the power supply connected to terminals B+ and ground G.

Figure 10:
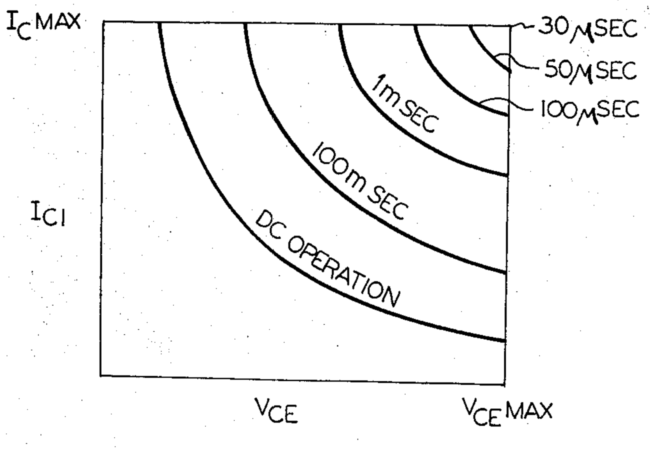
FIG. 10 is a graph illustrating, for explanatory purposes, the typical safe operating areas for a transistor for dc and pulse operation.
Figure 11:
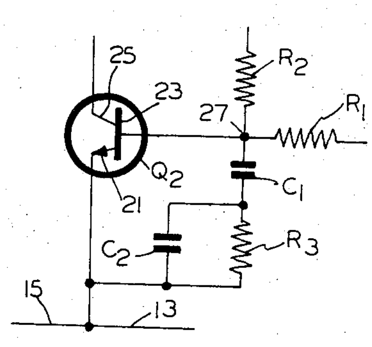

Typical safe operating curves for a conventional transistor are shown in the graph of FIG. 10, plotting collector current $I_C$ along the ordinate and collector-to-emitter voltage $V_{CE}$ along the abscissa for dc and pulsed operation. The maximum collector current $I_{C\ max}$ and maximum collector-to-emitter voltage, $V_{CE\ max}$, are published by the manufacturer. For dc operation, a curve (so labelled), usually of hyperbolic shape, is given which shows the maximum permissible dissipation at a transistor case temperature of usually 25° C. The same transistor, however, may dissipate a higher power for a shorter period of time. A silicon power transistor of type 2N3055, for example, is capable of dissipating 115 watts at a case temperature of 25° C for dc operation; but if a pulse is passed through the transistor for a period of 100 milliseconds, 2.1 times the dc dissipation is tolerable for the same transistor, with the multiplying factors being 3.0, 3.9, 5.8 and 7.7, for pulse lengths of 1 millisecond, 100 microseconds, 50 microseconds and 30 microseconds, respectively. To accommodate for the increased amounts of short-term dissipation that a transistor $Q_1$ may thus tolerate, without limiting of the drive signal to the transistor, a frequency-sensitive network may be connected as shown in FIG. 11 between the base electrode 23 and emitter electrode 21 of transistor $Q_2$. Here, the various time constants of the graph of FIG. 10 are simulated by capacitors $C_1$ and $C_2$ and resistor $R_3$ operating against the internal impedance of summing resistors $R_1$ and $R_2$. Any short-term pulse in either voltage or current arriving via resistors $R_1$ and $R_2$ at the terminal 27 and then base electrode 23 will be shunted to emitter electrode 21 by way of capacitors $C_1$ and $C_2$ and resistor $R_3$. While also allowing transistor $Q_1$ to experience higher short-pulse dissipation, increased power and volt/ ampere output of transistor $Q_1$ available between output terminal 11 and ground G is also provided than is otherwise possible in the circuits of FIGS. 1 and 5–7.

Figure 12:
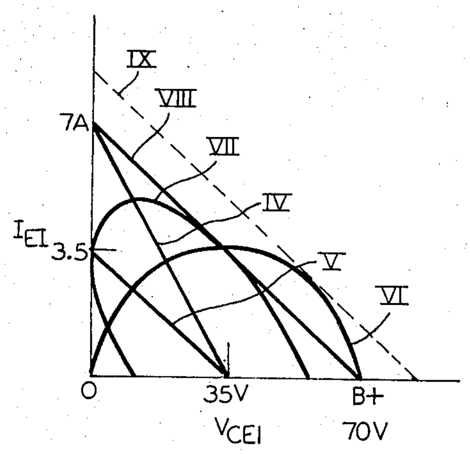
FIG. 12 is an explanatory graph constituting a load diagram of a transistor with resistive and reactive loads and permissible areas of operation.
Figure 13:
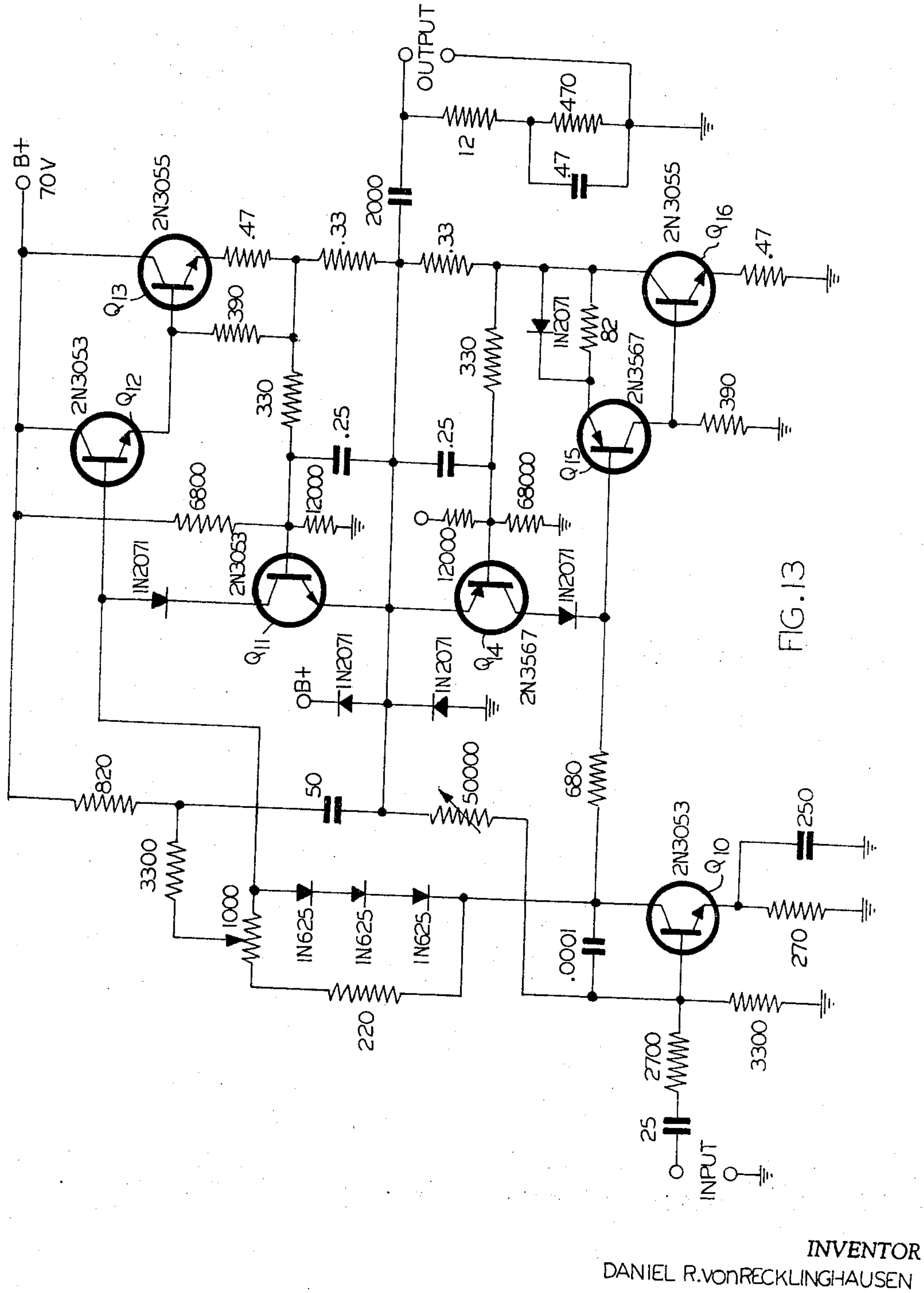
Figure 15:
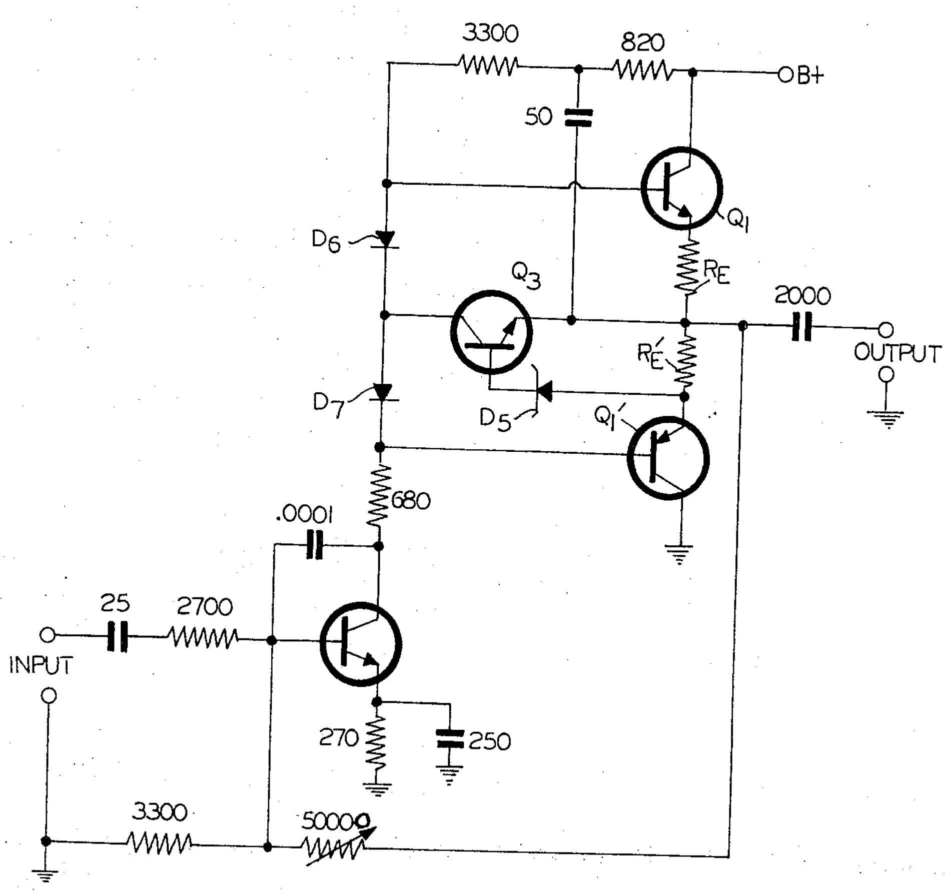

In such applications as audio amplifiers feeding loudspeakers and the like, power transistors are commonly employed in series-connected Class B push-pull circuits of the type shown in FIGS. 13 and 15. To understand the protection problem therefor, a consideration of the effect of different kinds of load impedance $Z_L$ is in order, reference being made to the graph of FIG. 12 that illustrates the paths of simultaneous emitter current $I_{E1}$ (plotted along the ordinate) and collector-to-emitter voltage $V_{CE1}$ (plotted along the abscissa) for various load impedances. Line IV, for example, is the "load line" for transistor $Q_1$ if it is part of a Class B push-pull series-connected circuit supplied with a total supply voltage B+ of 70 volts with a load resistance of 5 ohms; and line V, for a load resistance of 10 ohms. If a pure reactance of a nominal value of 10 ohms is connected as output load, operating curve VI occurs; an if connected in parallel with a resistance of 10 ohms, the elliptical load line VII will occur. Load line VII describes the operation when the load consists of a series combination of a 5 ohm resistor with a 5 ohm reactance. If a minimum load resistance of 5 ohms is suitable for this amplifier, and if this load resistance may have connected in series with it a load reactance of any value, the operation of transistor $Q_1$ is entirely restricted to operating within the triangle bounded by the line $I_{E1} = 0$, $V_{CE1} = 0$, and a straight line VIII having a slope of 10 ohms and passing through the points $I_{E1} = 7$ amperes, and $V_{CE1} = B+ = 70$ volts. As may be gathered, this slope actually represents a negative resistance, and oscillation of the combination of transistors $Q_1$ and $Q_2$ can well occur if both of them are simultaneously conducting but not saturated, and if line VIII is made equal to the protection line II (of FIG. 4) and the magnitude of the load impedance were equal to 10 ohms or higher, and the driving signal provided by generator $E_G$ were such that line VIII is reached during the operation of transistor $Q_1$. In order to prevent possible oscillation of this circuit, it is only necessary to shift line VIII outward to a new position given by the dashed line IX, so that under purely reactive load conditions, the purely reactive load line VI is just tangent to the new protection line IX at one point, and the magnitude of the slope of IX is equal to the magnitude of the pure reactance of IV. Since a pure reactance load for transistor $Q_1$ cannot be realized because of inevitable losses in the load reactance and the additional losses in current-sampling resistor $R_E$, the purely reactive curve VI will approach the partially reactive curve of VII. Under sinusoidal output conditions, thus, the protection line of IX will not be approached. Transistor $Q_2$ under sinusoidal output conditions will therefore not conduct and the combination of transistors $Q_1$ and $Q_2$ will not oscillate. Only an impedance load smaller in magnitude than the 10-ohm slope of line IX will cause conduction in transistor $Q_2$; but the total loop gain of transistors $Q_1$ and $Q_2$ and the associated circuit elements will result in a loop gain of less than one, which is not conducive of oscillation.

With the exception of the description of load lines in a Class B circuit operation in connection with FIG. 12, the class of operation of amplifier transistor $Q_1$ is not further described because the protective circuit is equally applicable whether transistor $Q_1$ operates in Class A (conducts all the time), Class B (conduction is 180° with a sinusoidal signal) or Class C (where conduction is less than 180° with a sinusoidal signal), or any intermediate class of operation. Similarly, load impedance $Z_L$ of FIG. 1 may be a resistance, a fully or partially reactive impedance, a resonant tuned circuit, or an output transformer.

The combination of elements shown in FIG. 1 and as modified in the later figures, furthermore, may be only one-half of a push-pull circuit, be it series-connected for direct currents or parallel-connected by way of, for example, a center-tapped output transformer. The same combination may also be part of a multi-phase circuit with $Q_1$ serving as one of the output devices for one of the phases. Generator $E_G$ with its internal resistance $R_G$ and transistor $Q_1$, moreover, may be a portion of an amplifier as well as part of an oscillator or other generator. If load impedance $Z_L$ is a transmission line, for example, transistor $Q_1$ could be part of a pulse generator. The circuit of FIG. 1, moreover, could obviously be modified to connect output terminal 11 to ground G and to connect the load impedance $Z_L$ between the terminal marked B+ and the actual supply voltage source B+. FIG. 13, however, shows the principles of the present invention as described in the foregoing paragraphs applied to a practical Class B push-pull series-connected audio amplifier, using an output coupling capacitor. All resistance values are shown in ohms and all capacitances in microfarads. In the circuit of FIG. 13, transistor $Q_{10}$ operates as a voltage amplifier and, in effect, as generator $E_G$ with internal impedance $R_G$. NPN transistors $Q_{12}$ and $Q_{13}$ in effect comprise transistor $Q_1$ of FIG. 1, and transistors $Q_1'$ and $Q_1''$ of FIG. 2. Transistor $Q_{11}$ in effect comprises transistor $Q_2$ of FIG. 1, with the 1N2071 diode connected in series with its collector, preventing conduction for reverse voltages. Transistors $Q_{15}$ and $Q_{16}$ in effect are the PNP equivalent of transistor $Q_1$ of FIG. 1 or transistors $Q_1'''$ and $Q_1''''$ of FIG. 3, with transistor $Q_{14}$ being the PNP equivalent of transistor $Q_2$ of FIG. 1, again with a 1N2071 diode connected in series with its collector lead. Transistors $Q_{11}$, $Q_{12}$ and $Q_{13}$ operate during the positive half-cycle and transistors $Q_{14}$ and $Q_{15}$ and $Q_{16}$ during the negative half-cycle. The 0.33-ohm emitter resistors of $Q_{13}$ and $Q_{16}$ are effectively the emitter current-sampling resistors $R_E$, the 330-ohm resistors connected thereto are effectively resistors $R_1$ of FIG. 1, and the 12,000-ohm and 68,000-ohm resistors connected to the base of $Q_{11}$ and $Q_{14}$, respectively, are resistors $R_{20}$ and $R_{21}$ of FIG. 6. The 0.25 $\mu$F capacitors connected to the same bases are effectively capacitances $C_1$ and $C_2$ of FIG. 11. The 1N2071 diodes connected between $B+$ and ground are effectively the reverse-voltage protecting diodes $D_4$ of FIG. 9. The three 1N625 diodes with the 1000-ohm potentiometer provide for the normal zero signal current of output transistors $Q_{13}$ and $Q_{16}$, and the 50,000-ohm potentiometer provides both negative feedback to voltage amplifier transistor $Q_{10}$, and for symmetrical output and proper dc operating voltage of transistor $Q_{13}$ and transistor $Q_{16}$.

The analyses of the preceding circuits are essentially applied to circuits of relatively high power where both voltage and current were used for the protection of the output transistor $Q_1$. If the same transistor $Q_1$ is used in a circuit of lower power, it may not be necessary to provide for both voltage and current protection of this transistor. Providing for current protection only by way of transistor $Q_2$ and voltage protection by a limited supply voltage $B+$ may prove to be sufficient and result in a greater simplicity of the protection circuit.

Figure 14:
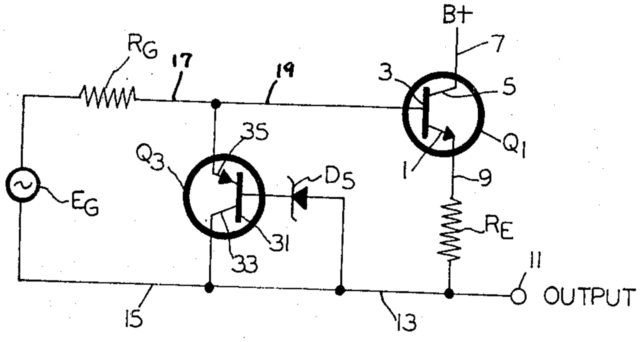

In FIG. 1 the omission of resistor $R_2$ and the possible short-circuiting of resistor $R_1$ will result in current limiting only. In FIG. 14, a PNP transistor is used as $Q_3$ with an avalanche diode $D_5$ connected between its base electrode 31 and its collector electrode 33, which is returned to leads 13 and 15. Emitter electrode 35 is connected to base electrode 3 of transistor $Q_1$ by way of lead 19, and collector electrode 33 is connected to the voltage source $V_G$ by way of lead 15 and output terminal 11 by way of lead 13. If the voltage drop across emitter resistor $R_E$ is equal to or larger than the sum of avalanche diode voltage $D_Z + V_{BE}3 - V_{BE1}$, transistor $Q_3$ will conduct and will permit a maximum current at transistor $Q_1$ in the same fashion as explained in FIG. 1.

Since a transistor will have current gain when its collector and emitter electrodes are interchanged and the transistor is essentially operated in reverse, a single transistor $Q_3$, FIG. 15, can consequently be used for the protection of the two series-connected transistors of a series connected push-pull amplifier having transistors $Q_1$ and $Q_1'$. The transistor $Q_3$ operates in exactly the same fashion as transistor $Q_2$ in FIG. 1 for the protection of transistor $Q_1'$ and operates in the fashion of transistor $Q_3$ of FIG. 14 for the protection of transistor $Q_1$, the biasing diodes $D_6$ and $D_7$ also providing for selection of proper voltages so that symmetrical current limiting in both transistors $Q_1$ and $Q_1'$ is possible.

Avalanche diode $D_5$ may be replaced by a forward conducting diode or eliminated altogether if emitter resistors $R_E$ and $R_E'$ are chosen so that the base-to-emitter voltage $V_{BE3}$ is equal to the product of maximum emitter current $I_{E1}$ and $E_{E1}'$ times the value of the emitter resistors $R_E$ and $R_E'$. While, moreover, the invention has been illustrated as described in connection with the important application to transistors, clearly the principles are equally applicable to other amplifiers and similar circuit devices, sometimes herein referred to generically as transistors and the like. Further modifications will also occur to those skilled in the art and all such are considered to fall within the spirit and scope of this invention as defined in the appended claims.

What is claimed is:

1. In combination, an amplifier having a pair of input terminals and a pair of output terminals, a voltage supply having supply terminals connected to said output terminals, respectively, a source of signals having signal terminals connected to said input terminals, respectively, and means for protecting said amplifier, said protecting means comprising switching means connected between said signal terminals and adapted, when actuated, to provide a conductive path between said signal terminals, first means including a connection to one of said output terminals for deriving a first electrical response dependent upon the voltage across said output terminals, second means including a connection to the other of said output terminals for deriving a second electrical response dependent upon the current passed through said amplifier between said output terminals, and third means connected to said first and second means for proportionally combining said responses and for actuating said switching means when a proportional combination exceeds a predetermined value.

2. A combination as set forth in claim 1, further comprising time constant means for preventing actuation of said switching means when said responses are less than of predetermined duration.

3. A combination as set forth in claim 1 and in which said combining means comprises means for producing different proportional combinations for different ranges of values of one of said responses.

4. A combination as set forth in claim 1 and in which said switching means comprises means for by-passing from said input terminals only that portion of amplifier driving signals at said signal terminals which is substantially in excess of a driving signal amplitude that causes said switching means to be actuated.

5. A combination as set forth in claim 1 and in which said amplifier comprises first transistor means having base, collector and emitter electrode means, the switching means comprises a normally non-conductive further transistor means having base, collector and emitter electrode means two of which electrode means are connected to said input terminals to enable conduction there-across, the said response deriving and combining means comprising resistance means connected to the collector and emitter electrode means of the first transistor means and the base electrode means of the further transistor means.

6. A combination as set forth in claim 5 and in which said resistance means comprises a pair of resistors one of which is an emitter load of the first transistor means and the other of which is connected between the collector and emitter electrode means of the first transistor means.

7. A combination as set forth in claim 6 and in which said emitter load resistor is connected to the base electrode means of the further transistor means by a further resistor.

8. A combination as set forth in claim 7 and in which said base electrode means of the first transistor means and said emitter load resistor are connected to the collector and emitter electrode means of the further transistor means.

9. A combination as set forth in claim 7 and in which the said first transistor means comprises a pair of successively connected transistors.

10. A combination as set forth in claim 7 and in which a voltage source is connected to the base electrode means of the further transistor means for establishing a voltage which affects the operating point at which said further transistor means may be rendered conductive.

11. A combination as set forth in claim 10 and in which said voltage source comprises diode means.

12. A combination as set forth in claim 6 in which said other resistor is substantially linear.

13. A combination as set forth in claim 5 and in which the resistance means connected to the collector electrode means of the first transistor means and the base electrode means of the further transistor means comprises a plurality of non-linear resistive networks providing successively different proportional combinations for rendering the further transistor means conductive.

14. A combination as set forth in claim 5 and in which reverse-conduction-preventing diode means is connected in series with the collector electrode means of the first transistor means.

15. A combination as set forth in claim 5 and in which reverse-conduction-preventing diode means is connected between the collector and emitter electrode means of the first transistor means.

16. A combination as set forth in claim 1, there being a pair of said amplifiers connected to said signal terminals and said voltage supply in a push-pull Class B circuit, each amplifier being provided with one of said protecting means.

17. A combination as set forth in claim 1 and in which said amplifier comprises a first transistor having base, emitter, and collector electrodes and said switching means comprises a second transistor having base, emitter, and collector electrodes, said input terminals being connected to said base and emitter electrodes of said first transistor, respectively, said emitter and collector electrodes of said second transistor being connected to said signal terminals, respectively, and said current-response-deriving means comprising an emitter load resistor connected to the emitter electrode of said first transistor and connected to the base electrode of said second transistor through a voltage threshold device.

* * * * *